United States Patent
Humele et al.

(10) Patent No.: US 9,138,916 B2
(45) Date of Patent: Sep. 22, 2015

(54) METHOD AND PLANT FOR THE MANUFACTURE OF CONTAINER PREFORMS

(75) Inventors: Heinz Humele, Thalmassing (DE); Konrad Senn, Regensburg (DE)

(73) Assignee: KRONES AG, Neutraubling (DE)

(*) Notice: Subject to any disclaimer, the term of this patent is extended or adjusted under 35 U.S.C. 154(b) by 291 days.

(21) Appl. No.: 13/024,475

(22) Filed: Feb. 10, 2011

(65) Prior Publication Data
US 2011/0198768 A1 Aug. 18, 2011

(51) Int. Cl.
| | |
|---|---|
| B29B 7/66 | (2006.01) |
| B29B 17/00 | (2006.01) |
| B29B 13/02 | (2006.01) |
| B29C 45/18 | (2006.01) |
| B29C 49/06 | (2006.01) |
| B29K 67/00 | (2006.01) |
| B29K 105/00 | (2006.01) |
| B29K 105/26 | (2006.01) |

(52) U.S. Cl.
CPC .............. *B29B 17/00* (2013.01); *B29B 13/021* (2013.01); *B29C 45/18* (2013.01); *B29C 49/06* (2013.01); *B29B 17/0005* (2013.01); *B29K 2067/00* (2013.01); *B29K 2105/251* (2013.01); *B29K 2105/253* (2013.01); *B29K 2105/26* (2013.01); *Y02W 30/62* (2015.05)

(58) Field of Classification Search
CPC B29B 17/00; B29B 17/0005; B29B 17/0052; B29B 17/02; B29B 17/04; B29B 17/0412
USPC ......................................................... 425/215
See application file for complete search history.

(56) References Cited

U.S. PATENT DOCUMENTS

| | | | |
|---|---|---|---|
| 4,151,247 A * | 4/1979 | Hafele | ..................... 264/328.16 |
| 4,392,804 A | 7/1983 | Pushee et al. | |
| 6,071,462 A * | 6/2000 | Putsch | ..................... 264/328.14 |
| 6,703,479 B1 | 3/2004 | McGehee et al. | |

(Continued)

FOREIGN PATENT DOCUMENTS

| | | |
|---|---|---|
| CN | 101198635 A | 6/2008 |
| CN | 101448566 A * | 6/2009 |

(Continued)

OTHER PUBLICATIONS

European Search Report for EP 11150211.8 mailed Jan. 2, 2012.

(Continued)

*Primary Examiner* — Christina Johnson
*Assistant Examiner* — Xue Liu
(74) *Attorney, Agent, or Firm* — Marshall, Gerstein & Borun LLP

(57) ABSTRACT

A method for the manufacture of container preforms in which recycled plastic material is subjected to at least one heat treatment in a recycling machine before it is transferred to a preform machine, where at least a major portion of heat introduced into the plastic material during its heat treatment and storage is transferred from the recycling machine with the plastic material into the preform machine. In a plant embodied for carrying out the method, the recycling machine is coupled with the preform machine either directly or via at least one intermediate storage such that at least a major portion of heat introduced in the recycling machine during a heat treatment of the plastic material can be transferred with the plastic material into the preform machine.

4 Claims, 1 Drawing Sheet

(56) References Cited

U.S. PATENT DOCUMENTS

| | | | |
|---|---|---|---|
| 6,730,774 B1 * | 5/2004 | Christel et al. | 528/500 |
| 2009/0192235 A1 | 7/2009 | Friedlaender et al. | |
| 2009/0292101 A1 * | 11/2009 | Fellinger | 528/272 |

FOREIGN PATENT DOCUMENTS

| DE | 19953659 | A1 | 5/2001 |
|---|---|---|---|
| DE | 10333648 | A1 | 9/2004 |
| DE | 102005013701 | A1 | 9/2006 |
| DE | 102006023354 | A1 | 11/2007 |
| JP | 2002309032 | A | 10/2002 |
| WO | WO-2006133469 | A1 | 12/2006 |
| WO | WO-2007131803 | A1 | 11/2007 |

OTHER PUBLICATIONS

German Search Report for DE102010002054.0, dated Sep. 30, 2010.
Notification of First Office Action, The State Intellectual Protery Office of P. R. China, Application No. 2011100410338.X, dated May 9, 2013.

* cited by examiner

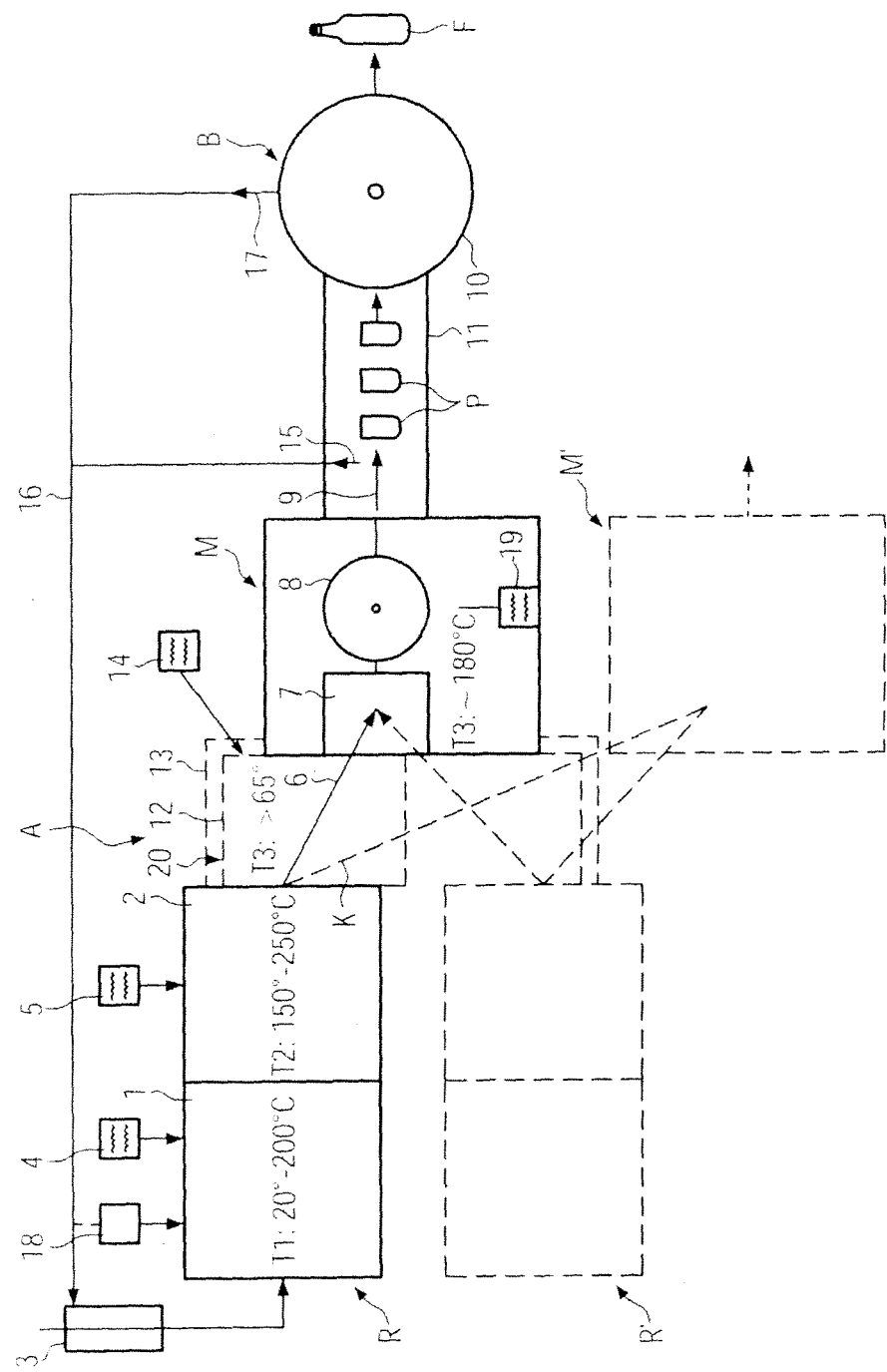

METHOD AND PLANT FOR THE MANUFACTURE OF CONTAINER PREFORMS

CROSS-REFERENCE TO RELATED APPLICATION

The present application claims the benefit of priority of German Application No. 102010002054.0, filed Feb. 17, 2010. The entire text or the priority application is incorporated herein by reference in its entirety.

FIELD OF THE DISCLOSURE

The disclosure relates to a method as well as to a plant for manufacturing container performs, such as in beverage bottling operations.

BACKGROUND

The manufacture of container preforms from recycled plastic material, in particular PET flakes, requires a very heat-intensive process. Moreover, the provision of recycled plastic material, in particular PET flakes, requires enormous heat supply to decontaminate the plastic material and optionally carry out an SSP treatment for processing. The SSP treatment is a standard process known in the field of PET plastic technology and means that an influence on the molecular chain (extension, shortening or maintenance) is performed (solid state polycondensation), i.e. a heat treatment over a certain period. Decontamination and SSP treatment can be carried out in a recycling machine in one reactor or in separate reactors, as is disclosed in DE 10 2005 013 701 A1. Decontamination is performed e.g. with hot gas, for example air or nitrogen, where heat is supplied via different heat transfer media until temperatures of, for example, between 100° C. and 180° C. are reached. The SSP treatment is carried out e.g. under subatmospheric pressure conditions, where temperatures up to at most the melting temperature of the plastic material of 150° C. to 250° C., preferably between 170° C. and 210° C. are set. The SSP treatment can run in an inert gas atmosphere, e.g. using nitrogen or carbon dioxide. In the recycling machine known from DE 10 2005 013 701 A1, after the SSP treatment, the recycled plastic material is cooled in a cooling reactor to a temperature between 50° C. and 100° C., preferably even to below 70° C., i.e. to a temperature below the second order transition temperature of the plastic material. For cooling, a cooling coil, a vibratory hopper conveyor, or a fluidized reactor, or another cooling device can be used, for example by supplying ambient air. Although at least the SSP treatment can be carried out in batches, by a multipart SSP reactor arrangement, a quasi continuous discharge of recycled plastic material can be achieved. The recycled plastic material cooled to below 65° C. is then fed to a preform machine, or it optionally previously completely cooled to room temperature. In the preform machine, the recycled plastic material then must be reheated to be able to produce the preforms.

BRIEF SUMMARY OF THE DISCLOSURE

One aspect of the disclosure is to provide a method and a plant for the manufacture of container preforms from recycled plastic material which permit at least an improved thermal balance in view of a considerable saving of primary thermal energy.

As at least a major portion of the introduced and stored heat required by the process for the provision of the recycled plastic material is transferred into the preform machine, the heat demand in the preform machine is significantly reduced, so that the thermal energy balance can be considerably improved in the manufacture of container preforms from recycled plastic material, supported, as an accompanying effect, by the elimination of the expenditure of time and the energy demand for cooling the recycled plastic material before it is transferred to the preform machine.

The connection of the recycling machine with the preform machine ensures in the plant that the recycled plastic material does no longer have to be force-cooled but is transferred into the preform machine such that at least a major portion of the heat introduced into the recycling machine during the heat treatment of the plastic material is transferred to the preform machine. Thus, the heat requirement of the preform machine is reduced and an advantage is achieved for the device in that a cooling unit for forced cooling of the recycled plastic material can be omitted.

In a functional method variant, the recycled plastic material, which is preferably provided predominantly in the form of flakes e.g. of PET, is transferred into the preform machine either directly or via an intermediate storage and in absence of atmospheric oxygen at a temperature that is in any case above the glass transition temperature of about 65° C. to 70° C. In this manner, heat is saved in the preform machine which would be required initially to bring recycled cold plastic material to this temperature again. Moreover, the duration of the process is shortened as forced cooling is eliminated. The at least substantial absence of oxygen in the transfer of the recycled plastic material into the preform machine excludes influences on the recycled plastic material that affect processing quality.

In a particularly functional way, the recycled plastic material is transferred into the preform machine at a temperature of at least about 180° C., so that for reaching the processing temperature of the recycled plastic material in the preform machine, now only low heat supply is required.

In a functional plant variant, the preform machine comprises at least one extruder supplied with the recycled plastic material and injection molds in which the preforms are manufactured. The recycling machine, which is combined in a block with the preform machine directly or via the intermediate storage, comprises at least one reactor, preferably at least one decontamination reactor, and a downstream SSP reactor, or at least one reactor in which decontamination and a further treatment, e.g. an SSP treatment, are carried out together. To achieve a quasi continuous discharge of recycled plastic material, it can be even functional to provide multipart decontamination and SSP reactors, or several reactors operated in an alternating and/or overlapping manner, or operated in combination. Furthermore, several preform machines can be fed with still hot recycled plastic material from the recycling machine simultaneously or in an alternating manner.

In a functional plant variant, a reactor, e.g. the decontamination reactor or the SSP reactor, and the extruder are combined in a block directly or via the at least one intermediate storage, preferably a silo. The combination in a block can preferably be heat-insulated and/or embodied such that the transfer of the recycled plastic material is effected at least substantially without the presence of oxygen. The absence of oxygen permits to carry out the transfer with a maximum portion of the heat introduced into the recycling machine without compromising the processing quality of the hot plastic material by the transfer.

In a functional plant variant, the combined block can even be connected to a heat supply which contributes to the increase or maintenance of the temperature of the plastic material during transfer and is possibly also fed by heat supply means of the recycling machine and/or the preform machine.

It is furthermore advantageous to provide a return means for discharged defective preforms between the preform machine and the recycling machine. In this manner, the defective preform discharge can be directly returned into the recycling machine without having to be intermediately stored, cooled and later reheated.

Furthermore, in view of an advantageous thermal energy balance, it can be advantageous to combine the preform machine directly in a block, preferably via a preform heat treatment section for adjusting a certain temperature profile in each preform, with a blow-molding machine. In this manner, heat from the preform machine can also be transferred into the heat treatment section or directly into the blow-molding machine.

Here, a return means for waste material and/or discharged defective containers can be suitably provided between the blow-molding machine and the recycling machine, so that the waste material or the discharged defective containers do not have to be separately stored, cooled and either rejected or recycled in another way. The return means altogether prevent a waste of plastic material.

BRIEF DESCRIPTION OF THE DRAWING

Embodiments of the subject matter of the disclosure are illustrated with reference to the drawing.

The FIGURE is a schematic representation of a plant for the manufacture of container preforms in accordance with the disclosure.

DETAILED DESCRIPTION OF THE PREFERRED EMBODIMENT

The plant A in the FIGURE is for the manufacture of container performs P, as an option with a direct block combination with a blow-molding machine B for the manufacture of blow-molded or stretch-blow molded hollow plastic containers, in particular PET bottles F, in particular PET flakes, and this in e.g. a continuous procedure.

More specifically, plant A for the manufacture of container preforms P in the FIGURE essentially consists of a recycling machine R for recycled plastic material K which is directly connected to a preform machine M, e.g. for injection-molding the preforms P, via a block 12. The block 12 can preferably be at least one intermediate storage 20 for hot recycled plastic material K, such as a silo or the like.

The essential components of the recycling machine R are at least one reactor, e.g. a decontamination reactor 1 and an SSP reactor 2 downstream thereof, or are combinable with it. The reactor, e.g. the decontamination reactor 1, is fed with plastic material via a metering device 3 (or as an alternative from a device for producing flakes), the plastic material predominantly consisting of flakes, preferably PET flakes from PET bottles.

The plastic material is subjected to a heat treatment in the reactor, e.g. in the decontamination reactor 1, e.g. within a temperature range T1 between 20° C. to 200° C., preferably within a temperature range around about 150° C., and over a treatment period that depends, among other things, on the particle size of the flakes. In the process, heat of at least one heat source 4 can be supplied to the reactor.

In the SSP reactor 2, a molecular chain length influence of the plastic in its solid state (solid state polycondensation) is effected, if provided, where further decontamination can also take place (combination reactor). This is done e.g. over a predetermined process duration within a temperature range T2 of about 150° C. to 250° C., preferably between about 170° C. and 210° C. Here, heat can be supplied to the SSP reactor 2 from a heat source 5. The SSP process preferably runs in an inert gas atmosphere (nitrogen or carbon dioxide) in absence of atmospheric oxygen, optionally at subatmospheric pressure.

The recycled plastic material K is, indicated by an arrow 6, transferred into the preform machine M at a temperature T3 which is above a temperature of about 65° C. (glass transition temperature of the plastic material), and is preferably about 180° C., this temperature coming from a major portion of the heat supplied in the heat treatment in the recycling machine R. If an SSP reactor 2 is provided, the recycled plastic material K is directly transferred from the SSP reactor 2 into the preform machine M by a block 12 which is embodied such that the transfer and the heat transfer at least essentially take place in absence of atmospheric oxygen. The block 12 can be embodied as intermediate storage 20, e.g. as silo, and can comprise a heat insulation 13 and optionally even a heat source 14 for supplying heat, at least to maintain the temperature T3, or even to increase it. At their hearts, the recycling machine R and the preform machine are connected to each other or combined in a block at least functionally, preferably even structurally.

The preform machine M comprises e.g. at least one extruder 7 which plasticizes the plastic material K and introduces it into injection molds 8 where the container preforms P continuously discharged at a discharge 9 are manufactured. Optionally, at least one further heat source 19 is functionally assigned to the preform machine M.

The manufactured container preforms P can be subsequently stored and cooled and forwarded to a blow-molding machine. In the embodiment in FIG. 1, however, the plant A for manufacturing the container preforms P from recycled plastic material K is directly combined in a block at least with a blow-molding machine B to be able to utilize the heat of the manufactured container preforms P to a maximum possible extent during blow molding stretch-blow molding). The blow-molding machine B has, for example, a blow rotor with non-depicted blow molds in which the containers, for example the PET bottles F, are continuously produced. As for blow-molding a certain temperature profile is required in each container preform P, a heat treatment section 11 can be provided between the preform machine M and the blow-molding machine B.

As two further options, which are provided either separately or in combination, at least one return means 16 is provided between the discharge 9 of the preform machine M and/or the blow-molding machine B to return discharged defective preforms (sorting out device 15) from the preform machine M and/or waste material and discharged defective containers (sorting out means 17) from the blow-molding machine B each to the recycling machine R, and this either to the metering or flake production means 3, or via a separate crushing means 18 directly into the decontamination reactor 1 (or the SSP reactor 2).

The recycling machine R can supply several preform machines M simultaneously. To permit a quasi continuous procedure, at least two recycling machines R, R' (or reactors 1, 2) can be assigned to one preform machine M or several preform machines M, M'. The blow-molding machine does not necessarily have to be combined in a block with the preform machine M. The recycling machine R could also comprise only one reactor which is used for decontamination and for the SSP process.

In the recycling machine R, preferably adiabatic process conditions prevail. The heat sources 4, 5, 14, 19 can be operated with any arbitrary heat transfer media (water, vapor, electrically, thermal oil, or the like). As a further option, instead of the fixed block 12 between the recycling machine R and the preform machine M, an interchangeable container system could also be used, for example such that one interchangeable container each is being filled with a hatch at the recycling machine R, then closed and transferred to the preform machine M and connected there, so that with at least two interchangeable containers, a quasi continuous operation is permitted. These interchangeable containers can be heat-insulated or even heated.

The invention claimed is:

1. Plant for the manufacture of container preforms from recycled PET flakes plastic material, the plant comprising at least one preform forming machine including at least one extruder to be fed with the recycled PET flakes plastic material from at least one recycling machine,
   wherein the recycling machine comprises at least one of a decontamination reactor and/or an SSP reactor, the decontamination reactor and/or the SSP reactor being structurally combined with the preform machine by a connecting block, the connecting block being heat-insulated and configured to transfer, essentially in absence of atmospheric oxygen, the recycled PET flakes plastic material from the at least one recycling machine to the at least one preform forming machine such that at least a major portion of heat introduced into the PET flakes plastic material in the recycling machine during a heat treatment of the PET flakes plastic material is transferred with the PET flakes plastic material into the preform machine,
   wherein the preform machine is directly combined in a block with a blow-molding machine.

2. Plant according to claim 1, and wherein a return means for discharged defectively formed preforms is provided between the preform machine and the recycling machine.

3. Plant according to claim 1, and wherein a return means for waste material and/or discharged defective containers of the blow-molding machine is provided between the blow-molding machine and the recycling machine.

4. Plant according to claim 1, wherein the at least one recycling machine comprises at least one combined decontamination and SSP reactor.

* * * * *